United States Patent
Greco et al.

(10) Patent No.: US 8,194,085 B2
(45) Date of Patent: *Jun. 5, 2012

(54) APPARATUS, SYSTEM, AND METHOD FOR GRAPHICS MEMORY HUB

(75) Inventors: Joseph David Greco, San Jose, CA (US); Jonah M. Alben, San Jose, CA (US); Barry A. Wagner, San Jose, CA (US); Anthony Michael Tamasi, Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/327,626

(22) Filed: Dec. 3, 2008

(65) Prior Publication Data

US 2009/0079748 A1 Mar. 26, 2009

Related U.S. Application Data

(63) Continuation of application No. 11/303,187, filed on Dec. 15, 2005, now Pat. No. 7,477,257.

(51) Int. Cl.
*G09G 5/39* (2006.01)
*G06F 13/28* (2006.01)
*G06F 13/00* (2006.01)
*G06F 13/14* (2006.01)

(52) U.S. Cl. ........ 345/531; 345/533; 345/536; 345/520; 711/111; 711/154

(58) Field of Classification Search ................ None
See application file for complete search history.

(56) References Cited

U.S. PATENT DOCUMENTS

| 5,301,278 | A | 4/1994 | Bowater et al. |
| 6,260,127 | B1* | 7/2001 | Olarig et al. ................... 711/167 |
| 6,532,525 | B1 | 3/2003 | Aleksic et al. |
| 6,630,936 | B1 | 10/2003 | Landendorf |
| 6,792,516 | B2 | 9/2004 | Mastronarde et al. |
| 6,907,493 | B2 | 6/2005 | Ryan |
| 7,065,050 | B1 | 6/2006 | Herbst |
| 7,088,710 | B1 | 8/2006 | Johnson et al. |
| 7,120,727 | B2 | 10/2006 | Lee et al. |
| 2002/0054604 | A1 | 5/2002 | Kadambi et al. |
| 2002/0145611 | A1* | 10/2002 | Dye et al. ...................... 345/543 |
| 2003/0122834 | A1 | 7/2003 | Mastronarde et al. |
| 2003/0177303 | A1 | 9/2003 | Landendorf |

(Continued)

FOREIGN PATENT DOCUMENTS

JP 2005537543 12/2005

OTHER PUBLICATIONS

Haas et al., "OSAP005 Advances In Server Memory Technology" pp. 1-35.

(Continued)

*Primary Examiner* — Tize Ma
(74) *Attorney, Agent, or Firm* — Cooley LLP

(57) ABSTRACT

A memory hub permits a graphics processor to access random access memories, such as dynamic random access memories (DRAMs). In one implementation, the memory hub permits an increase in effective memory bandwidth by aggregating the memory of two or more memories. In another implementation, the memory hub permits a graphics processor to offload memory access interfacing operations to the memory hub.

10 Claims, 3 Drawing Sheets

U.S. PATENT DOCUMENTS

| | | | |
|---|---|---|---|
| 2004/0017804 | A1 | 1/2004 | Vishnu |
| 2004/0044857 | A1 | 3/2004 | Jeddeloh et al. |
| 2004/0168020 | A1 | 8/2004 | Ryan |
| 2004/0260864 | A1 | 12/2004 | Lee et al. |
| 2007/0067517 | A1 | 3/2007 | Kuo |

OTHER PUBLICATIONS

"Intel Desktop Board CC820 Technical Product Specification" pp. 1-122, Nov. 1999.

"Intel Desktop Board CC820 Specification Update," pp. 1-122, Jun. 2000.

"DDR2 SDRAM FBDIMM," Micron Technology, Inc., pp. 1-36, 2004.

Hass et al., "Fully Buffered DIMM Technology Moves Enterprise Platforms to the Next Level," pp. 1-7, Mar. 2005.

European Search Report from Application No. EP06006270.0-2212 dated Feb. 27, 2007.

Japanese Patent Appln. No. 2006-088642 filed Mar. 28, 2006. Applicant: Nvidia Corporation. Examination Report mailed Oct. 4, 2011. (Partial translation dated Oct. 17, 2011 is included).

* cited by examiner (PRIOR ART)

Page image: US 8,194,085 B2

APPARATUS, SYSTEM, AND METHOD FOR GRAPHICS MEMORY HUB

CROSS REFERENCE TO RELATED APPLICATION

This is a continuation application of U.S. application Ser. No. 11/303,187, filed Dec. 15, 2005, which is hereby incorporated herein by reference in its entirety.

FIELD OF THE INVENTION

The present invention is generally related to techniques to couple memories to a graphics processing unit. More particular, the present invention is directed to techniques to increase memory bandwidth in a graphics processing system.

BACKGROUND OF THE INVENTION

FIG. 1 illustrates a conventional graphics processing system 100. Certain conventional components are omitted for the purposes of illustration. A graphics processing unit (GPU) 110 includes a memory controller 112 coupled to dynamic random access memories (DRAMs) 120 via DRAM buses 115. DRAM has specific interface protocols. Thus, GPU 110 requires DRAM memory bus interfaces 125 compatible with DRAM memory.

One drawback of graphics processing system 100 is that the memory bandwidth may be less than desired. The total memory bandwidth scales with the number of DRAM memories 120 that can be simultaneously utilized by GPU 110. The number of DRAMs 110 that can be coupled to GPU 100 is limited by several considerations. One consideration is that the total number of input/output (I/O) interfaces in GPU 100 is limited. For example, in a ball-grid array packaging scheme, there is a limited number of balls per unit area that can be fabricated to provide access to memory. Thus, for a given GPU chip area, a limited number of balls can be allocated to servicing DRAM memory.

Another drawback of graphics processing system 100 is that GPU 110 is required to have DRAM interfaces 125 compatible with different versions of DRAM memory. Double data rate (DDR) memory, for example, has several different protocols, such as DDR and DDR2. Designing GPU 110 to be compatible with different DRAM memory protocols increases the cost and complexity of GPU 110.

Another drawback of graphics processing system 100 relates to the potential patent licensing burden. Many memory protocols are set by standard setting bodies. Such standard setting bodies typically require that participants in the standard setting body license essential patents required to practice the standard on a reasonable and non-discriminatory basis (RAND). Additionally, third parties may also hold patents related to preferred techniques to implement the standard. Thus, designing a GPU 110 to support a number of different memory protocols increases the potential patent licensing burden on GPU 110.

In light of the problems described above, the apparatus, system, and method of the present invention was developed.

SUMMARY OF THE INVENTION

A graphics system includes a memory hub. The memory hub is utilized by a graphics processing unit to access a plurality of memories, such as DRAM memories. The memory hub performs memory access processes. Applications of the memory hub of the present invention include increasing memory bandwidth of a graphics system, offloading memory access processes from a graphics processing unit, and providing an adaptation functionality to make different types of memories compatible with a graphics processing unit.

One embodiment of the present invention is for a memory hub. The memory hub has a dynamic random access memory (DRAM) interface operative to access a plurality of DRAM memories utilizing at least one DRAM protocol. The memory hub includes a hub interface for accessing a graphics processing unit. Logic is included for bridging signals between the hub interface and the DRAM interface and performing translation of signals between the hub interface and the DRAM interface. The memory hub is operative for a graphics processing unit to utilize the hub interface to access two or more DRAMs.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
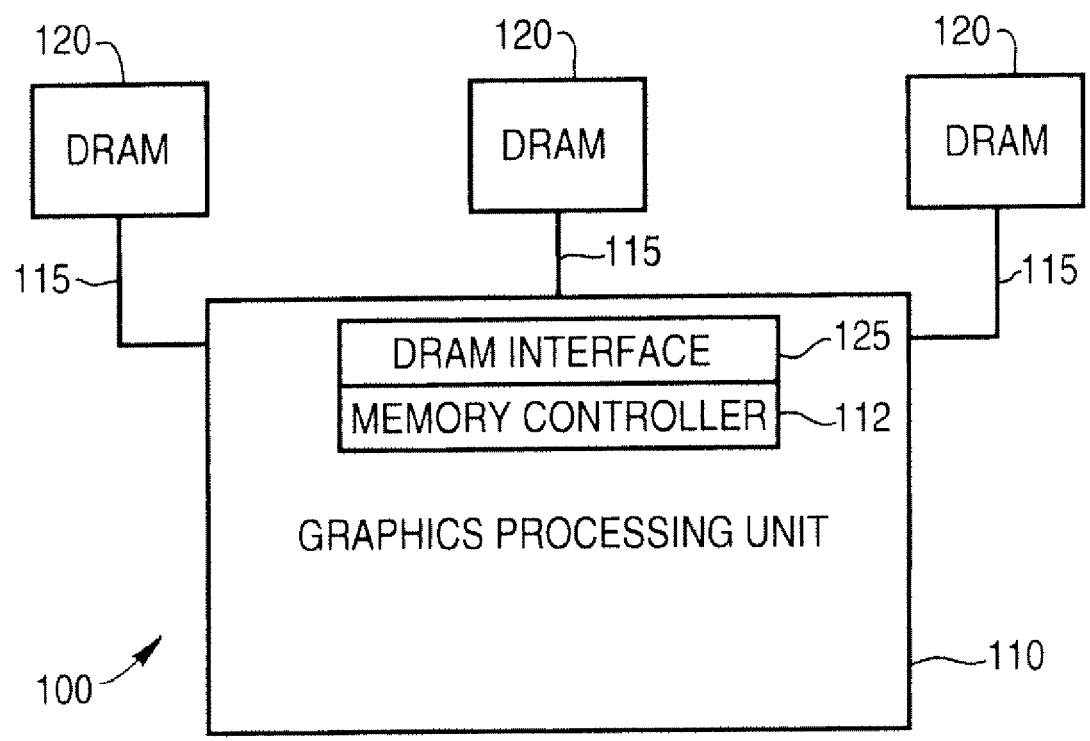
FIG. 1 is a block diagram of a prior art graphics processing unit directly coupled to random access memories.
Figure 2:
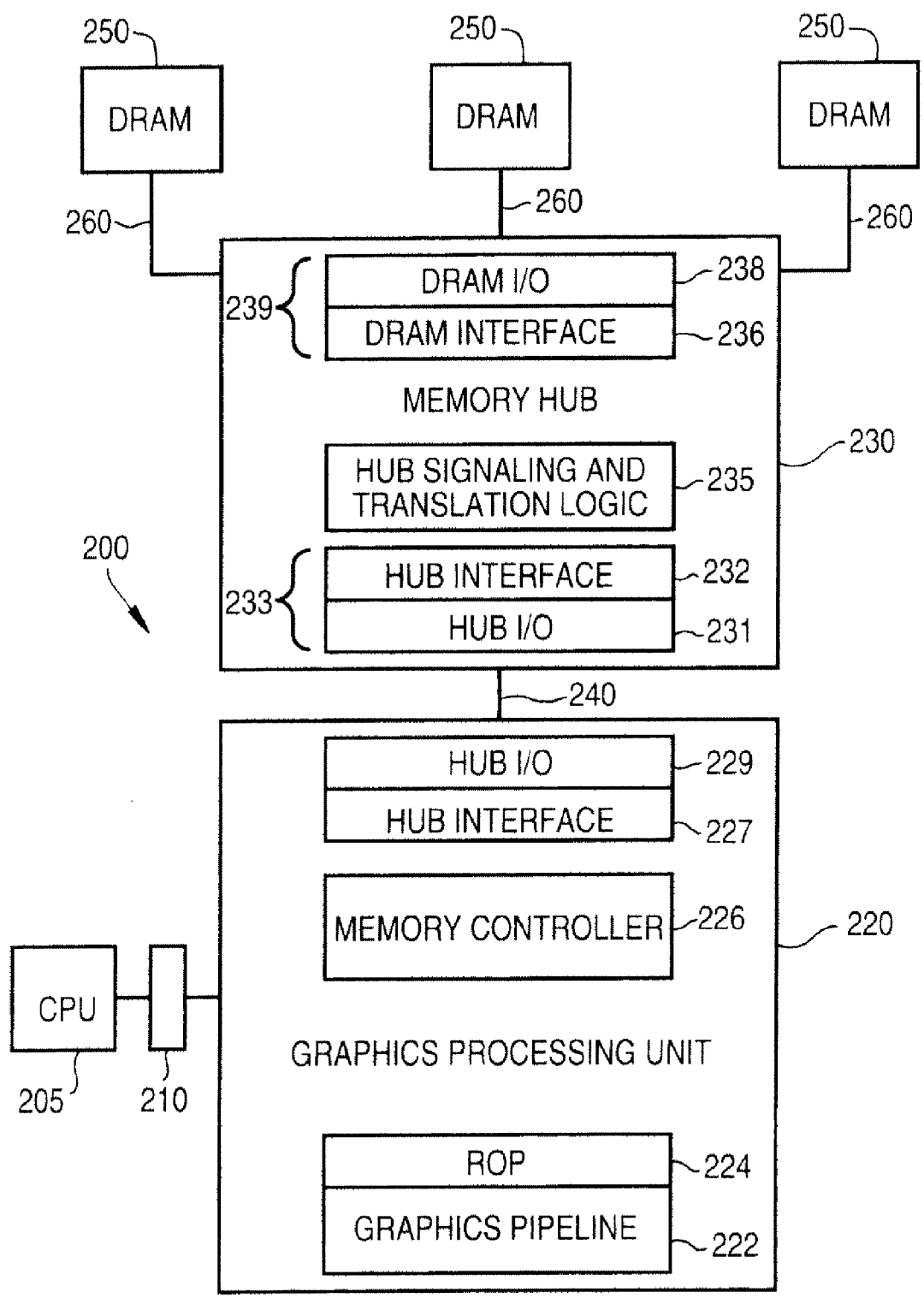
FIG. 2 is a block diagram of a graphics system including a memory hub in accordance with one embodiment of the present invention.

FIG. 2 illustrates a graphics system 200 in accordance with one embodiment of the present invention. Graphics system 200 includes a central processing unit (CPU) 205, interface 210 (e.g., one or more bridges and associated buses) coupling CPU 205 to a graphics processing unit (GPU) 220, a memory hub 230 coupled to GPU 220 via a hub bus 240, and random access memories (RAM) 250 coupled to memory hub 230 via memory input/output (I/O) buses 260.

Memory hub 230 includes a GPU connection portion 233 for accessing GPU 220 and a RAM connection portion 239 for accessing RAM memory. Hub logic 235 performs signal bridging and any necessary translation of signals between RAM connection portion 239 and GPU connection portion 233.

It is contemplated that memory hub 230 may be utilized for a variety of different RAM memory architectures. However dynamic random access memory (DRAM) is commonly used in graphics systems such that in the following discussion RAM memories are described in an exemplary embodiment as DRAM. It is well known in the graphics art that there are a number of different DRAM protocols that may be used to implement a memory for a graphics system. It will therefore be understood that memory hub 230 may be adapted to support one or more different DRAM protocols, including variations of DRAM especially adapted for graphics systems. For example, DRAM memories 250 may be single data rate (SDR) synchronous dynamic random access memories (SDRAMs) or double data rate (DDR) SDRAMs such as DDR and DDR2 memories. DRAM memories 250 may also be implemented using a variation of SDRAM specially adapted for graphics systems, such as a graphics double data rate (GDDR) type memory. Examples of GDDR type memories include GDDR, GDDR2, GDDR3, and GDDR4. The GDDR memory may further be a synchronous graphic random access memory (SGRAM) memory (e.g., GDDR SGRAM, GDDR2 SGRAM, GDDR3 SGRAM, and GDDR4 SGRAM). It will be understood, however, that the memory hub 230 of the present invention may be adapted to support DRAM standards and implementations other than those described above.

Memory hub 230 may be used to provide several different benefits, alone or in combination, depending upon the implementation. In an aggregation implementation, memory hub 230 is used to aggregate two or more DRAM memories 250 to improve memory bandwidth per number of I/O connections (ergo, physical pins or balls in a ball grid array package) on GPU 220. Memory hub 230 may also be used to offload DRAM memory access protocols from GPU 220 to memory hub 230. In an adaptation implementation, enough DRAM interfacing is performed in memory hub 230 such that memory hub 230 is used to make GPU 220 compatible with different types of DRAM memories 250.

In one embodiment, memory hub bus 240 is a high-speed bus, such as a bus communicating data and memory requests in data packets (a "packetized" bus). For example, high-speed I/O buses may be implemented using a low voltage differential signal technique and interface logic to support a packet protocol to transmit and receive data as data packets. In one embodiment, GPU 220 includes a hub interface 227 and hub I/O module 229 and memory hub 230 includes a hub I/O module 231 and hub interface 232. For example, hub I/O modules 231 and 229 may include hardware and associated I/O pins for supporting an I/O bus whereas hub interfaces 232 and 229 include interfacing logic to support a bus protocol. However, it will be understood that the functionality of the I/O hardware and interface logic functionality may be combined into single hub interfaces 227 and 232.

As one example, hub bus 240 may be implemented using a proprietary bus technology, such as a high-speed differential bus. Alternatively, a high-speed bus standard, such as the Peripheral Component Interconnect Expresss (PCI-E) bus standard specification may be used. The Peripheral Component Interconnect Special Interest Group (PCI-SIC) publishes the "PCI-E Base Specification", the contents of which are hereby incorporated by reference. An advantage of using a high speed hub bus 240 is that it permits a reduction in pin count. Conventional DRAM memories 250 utilize comparatively slow non-packetized I/O buses 260. Thus, a single high speed hub bus 240 may be used to access several conventional DRAM memories 250 using a comparatively small number of GPU I/O pins or balls devoted to memory accesses (not shown in FIG. 2). This permits the total memory bandwidth to be increased for a given number of I/O pins/balls of GPU 220 devoted to memory accesses. Or, in other words, for a given memory bandwidth, the required number of balls/pins on GPU 220 is reduced. The reduction in I/O pin/ball count on GPU 220 will scale with the ratio of the bus speed of hub bus 240 to DRAM I/O buses 260. As an illustrative example, if hub bus 240 provides an approximately factor of two faster (per pin/ball) transfer rate than conventional DRAM I/O buses, then the use of hub bus 240 will reduce the pin count on GPU 220 required to access DRAM memory by a factor of two. However, it is contemplated that memory hub 230 may also be utilized to couple a GPU 220 having a wide (but slow per pin) hub bus 240 to a fast differential memory (not shown).

GPU 220 includes a graphics pipeline 222. A stage of graphics pipeline 222 requires access to data from DRAM memories 250, such as a raster operations (ROP) stage 224.

GPU 220 includes a memory controller 226 that issues memory read and memory write requests on the behalf of graphics clients, such as ROP stage 224. Memory controller is coupled to hub interface 228. Hub interface 228 utilizes hub bus 240 to send memory read/write requests to DRAMs 250 and receive returned data.

Memory hub 230 includes a DRAM I/O module 238 to support input/output operations with DRAMs 250 via I/O buses 260. As is well known in the memory art, each type of DRAM memory typically has its own particular signaling protocol and bus terminations, such as low voltage transistor to transistor logic (LVTTL) for SDRAM and stub series terminated logic (SSTL) supporting low voltage differential signaling for DDR memory. A DRAM interface 236 supports DRAM memory access interface processes. Exemplary DRAM memory access interface processes which may be supported by DRAM interface 236 include: a dynamic random access memory (DRAM) initialization sequence; a mode register command sequence; support for transmitting data to dynamic random access memory over the rising and falling edge of a clock; support for supplying a data mask to dynamic random access memory over a falling edge of a clock; and a DRAM protocol for storing and retrieving DRAM cell contents such as a read command, a write command, a refresh command, a bank/row command, and a pre-charge command. More generally, DRAM memory interface 236 may be used to offload DRAM interface processes mandated by memory standards such as those required by SDR SDRAM memory, GDDR SGRAM memory, DDR memory (i.e., the DDR and DDR2 standards promoted by the Joint Engineering Device Engineering Councils (JEDEC)), or any of the other previously described DRAM standards.

Memory hub 230 also includes logic 235 to support signal bridging and any necessary translation between hub interface 232 and DRAM interface 236. This may include, for example, logic to support aggregation of several DRAM memories and perform any translations required to account for differences in the protocol of DRAM interface 236 and the protocol of hub interface 232.

Memory hub 230 is preferably designed to increase total memory latency within a pre-selected latency budget. For example, conventional DRAM memory may ordinarily have about twenty clock cycles of latency. Memory hub 230 may be designed to add a small number of additional clock cycles of latency to the conventional DRAM memory latency. In a GPU 220 performing parallel processing of graphics data a small increase in memory latency will typically not significantly reduce total performance. This is due, in part, to the fact that a high performance GPU 220 may have hundreds or thousands of parallel processing threads that divide up the work performed to process graphics frames. As a result, small increases in memory latency do not significantly decrease performance in a massively parallel GPU architecture. In contrast, the performance of a CPU 205 having a small number of processing threads (e.g., one thread) is critically dependent on a small latency to prevent idle clock cycles when no processing is performed.

Figure 3:
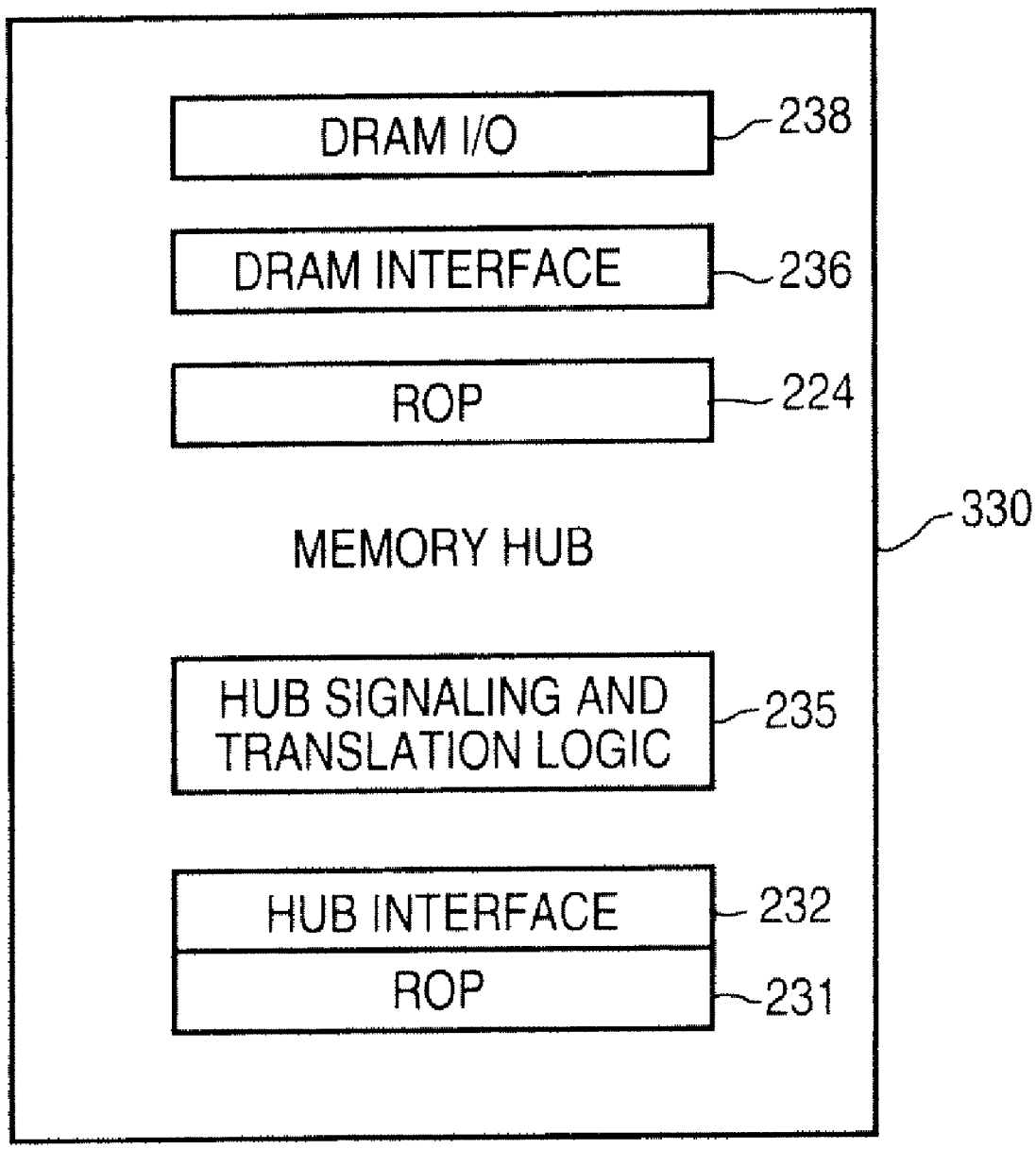
FIG. 3 is a block diagram of a memory hub including a raster operations module in accordance with one embodiment of the present invention.

FIG. 3 illustrates an embodiment of a memory hub 330 in which a ROP stage 224 is included in a memory hub 330. Placing a ROP stage 224 closer to physical memory may provide performance advantages for ROP processes that are latency sensitive. Additionally, placing ROP stage 224 closer to physical memory may be useful for a GPU that is not massively parallel. Thus, as an alternative to designing a low-latency memory hub, part or all of the functionality of ROP stage 224 may be moved into memory hub 330.

One application of the present invention is to increase memory bandwidth of a graphics processor 220. Memory hub 230 permits an increase in the number of memories that can be coupled to GPU 220 using a fixed number of GPU I/O connections (e.g., balls of the GPU in a ball-grid-array package). Another application of the present invention is to provide an adaptation function. Memory hub 230 may be designed to make GPU 220 compatible with several different types of memories. Still yet another application of the present invention is to offload one or more memory access protocols to memory hub 230. Memory access protocols may be subject to reasonable and non-discriminatory (RAND) licensing provisions set by standard setting organizations. By placing the functionality of memory access protocols in memory hub 230 the licensing burden associated with the memory access protocols lies with a comparatively low-cost memory hub 230, not within a high-value GPU 220. Additionally, different versions of memory hub 230 may be created to minimize the number of units requiring specific licenses for graphics system 200 to be manufactured with different types of memory. For example one version of memory hub 230 may support DDR2 and another may support GDDR SGRAM. The memory hub 230 may, for example, be designed to minimize the number of licenses that must be procured, minimize the number of units requiring a license, or minimize the value of the units from which licensing royalties are calculated.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A memory hub for a graphics system to be compatible with different memories, comprising:
   a dynamic random access memory (DRAM) interface supporting DRAM interface processes of a plurality of different types of DRAM memories with each type of DRAM memory being compliant with a specific DRAM memory standard having a signaling protocol and bus terminations defined by the specific DRAM memory standard;
   a hub interface; and
   logic for bridging signals between said hub interface and said DRAM interface and performing translation of signals between said hub interface and said DRAM interface;
   said memory hub being operative for a graphics processing unit to utilize said hub interface to access any type of DRAM memory within the plurality of different types of DRAM memories supported by the memory hub,
   said memory hub being operative to aggregate simultaneous access to multiple ones of the plurality of different types of DRAM memories to increase memory bandwidth,
   said hub interface being operative to utilize a high speed packetized bus protocol, and said DRAM interface being operative to utilize a non-packetized bus protocol,
   said high speed packetized bus protocol has at least a factor of two faster transfer rate than said non-packetized bus protocol, such that said memory hub reduces an I/O pin count on said graphics processing unit.

2. The memory hub of claim 1, wherein at least one DRAM memory access interfacing operation is offloaded from said graphics processing unit to said memory hub.

3. The memory hub of claim 2, wherein a DRAM initialization sequence is offloaded to said memory hub.

4. The memory hub of claim 2, wherein a mode register command sequence is offloaded to said memory hub.

5. The memory hub of claim 2, Wherein said DRAM interface supports transmitting data over the rising and falling edge of a clock.

6. The memory huh of claim 2, wherein said DRAM interface supports supplying a data mask over a falling edge of a clock.

7. The memory hub of claim 2, wherein a DRAM protocol for storing and retrieving DRAM cell contents is offloaded to said memory hub.

8. The memory hub of claim 7, wherein said DRAM protocol includes at least one protocol selected from the group consisting of a read command, a write command, a refresh command, a bank/row command, and a pre-charge command.

9. The memory hub of claim 1, wherein said DRAM interface supports at least one DRAM protocol from the group consisting of SDR SDRAM, DDR SDRAM, DDR2 SDRAM, GDDR SGRAM, GDDR2 SGRAM, GDDR3 SGRAM, and GDDR4 SGRAM.

10. A graphics processing system, comprising:
   a graphics processing unit (GPU), said GPU including:
      a graphics pipeline;
      a memory controller integrated with the GPU; and
      a first memory hub interface integrated with the GPU;
   a separate memory hub having a second memory hub interface linked to the first memory huh interface of the GPU, the separate memory hub including a dynamic random access memory (DRAM) interface supporting DRAM interface processes compliant with different DRAM memory standards and logic for bridging signals between said second memory hub interface and said DRAM interface and performing translation of signals between said second memory hub interface and said DRAM interface;
   a plurality of DRAM memories coupled to said DRAM interface;
   wherein at least one DRAM interface process defined by a DRAM standard is offloaded from the GPU to the separate memory hub,
   wherein said separate memory hub is operative to aggregate access to multiple ones of the plurality of DRAM memories to increase memory bandwidth,
   wherein said second memory hub interface is linked to said first memory huh interface using a high speed packetized bus protocol, said DRAM interface utilizes a non-packetized bus protocol,
   wherein said high speed packetized bus protocol has at least a factor of two faster transfer rate than said non-packetized bus protocol, such that said separate memory hub reduces an I/O pin count on said GPU.

* * * * *